United States Patent [19]

Hilgert et al.

[11] 4,061,576
[45] Dec. 6, 1977

[54] INLINE OIL FILTER ASSEMBLY

[75] Inventors: Charles William Hilgert; Raymond Joseph Lobmeyer, both of Dubuque, Iowa

[73] Assignee: Deere & Company, Moline, Ill.

[21] Appl. No.: 768,996

[22] Filed: Feb. 16, 1977

Related U.S. Application Data

[63] Continuation of Ser. No. 595,274, July 14, 1975, abandoned.

[51] Int. Cl.² .............................................. C02C 1/14
[52] U.S. Cl. ................................ 210/437; 210/450; 210/451; 210/455; 210/457
[58] Field of Search ............... 210/435, 437, 438, 439, 210/441, 442, 445, 446, 450, 451, 453, 455, 456, 457, 483, 488, 489, 497, 350, 352, 224, 227, 228, 229, 230, 232, 252

[56] References Cited

U.S. PATENT DOCUMENTS

| | | | |
|---|---|---|---|
| 1,986,774 | 1/1935 | Hoffner | 210/281 |
| 2,158,238 | 5/1939 | Hvid | 210/451 |
| 2,642,186 | 6/1953 | Garland et al. | 210/437 |
| 2,933,192 | 4/1960 | Gretzinger | 210/437 |
| 2,946,450 | 7/1960 | Shaw | 210/437 |
| 3,022,894 | 2/1962 | Karlen | 210/452 |
| 3,286,838 | 11/1966 | Jones | 210/455 |
| 3,522,822 | 8/1970 | Dykes | 137/607 |

*Primary Examiner*—Frank W. Lutter
*Assistant Examiner*—Frank Sever

[57] ABSTRACT

End members are provided which are identical to each other and are interchangeable for use in constructing an inline oil filter assembly of a first type including a replaceable filter element or for use in constructing an oil filter assembly of a second type including a replaceable cartridge embodying a filter element. The end members of a given assembly are interconnected by a center bolt which extends centrally through a hollow cylindrical housing of the assembly and each end member is provided with a fluid passage which forms either an inlet or an outlet passage of the assembly and which includes a portion that is located such that the bolt extends axially and centrally therethrough.

3 Claims, 4 Drawing Figures

INLINE OIL FILTER ASSEMBLY

CROSS REFERENCE TO RELATED APPLICATION

This is a continuation of U.S. application Ser. No. 595,274 filed July 14, 1975, now abandoned.

BACKGROUND OF THE INVENTION

The present invention relates to an oil filter assembly and more particularly relates to an end member construction for such an assembly.

Oil filter assemblies now in common use are generally of two types. One of the two types is constructed such that only the filter element need be replaced when it becomes full of contaminants while the other of the two types is constructed such that the filter element is embodied in a cartridge which must be replaced when the filter element becomes full of contaminants.

No matter what type of filter assembly is employed, it is desirable that the construction thereof be simple, easy to disassemble for service and economical to construct.

SUMMARY OF THE INVENTION

According to the present invention there is provided a novel inline oil filter assembly.

A broad object of the invention is to provide an inline oil filter assembly of simple, economical construction.

A more specific object of the invention is to provide an inline oil filter assembly having identical opposite end members.

Yet another object of the invention is to provide filter end members which may be used either in constructing a filter assembly of a first type embodying a replaceable filter element or in constructing a filter assembly of a second type embodying a replaceable cartridge.

These and other objects will become apparent from reading the following description in conjunction with the appended drawings.

DESCRIPTION OF THE PREFERRED EMBODIMENT

Figure 1:
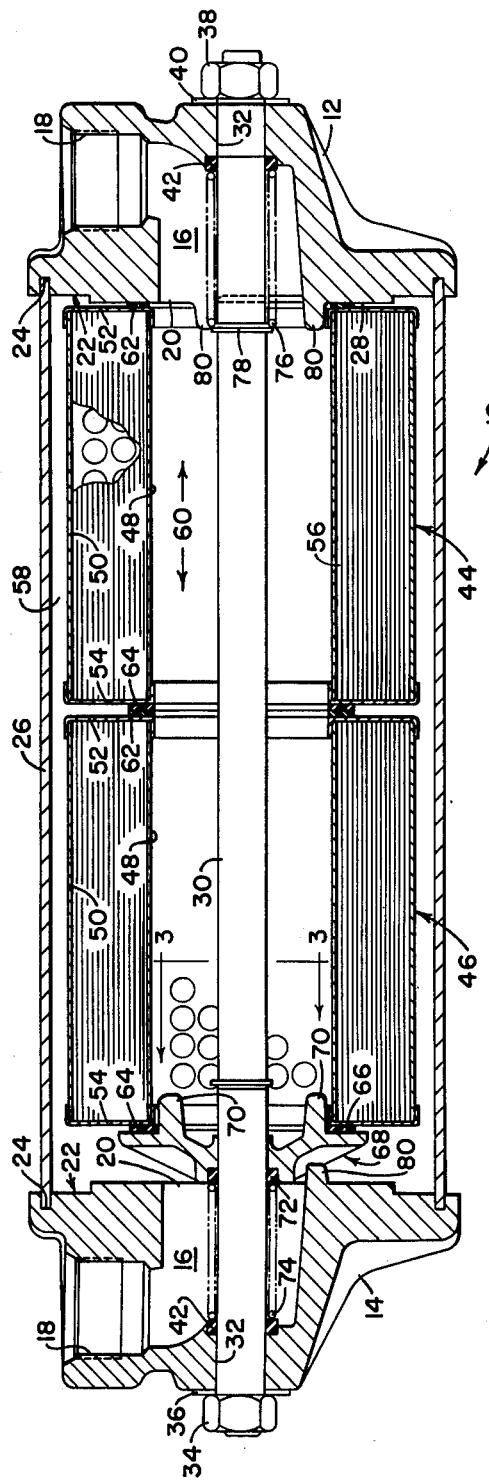
FIG. 1 is a longitudinal sectional view of an inline oil filter, of the replaceable element type, embodying end members constructed according to the principles of the present invention.
Figure 2:
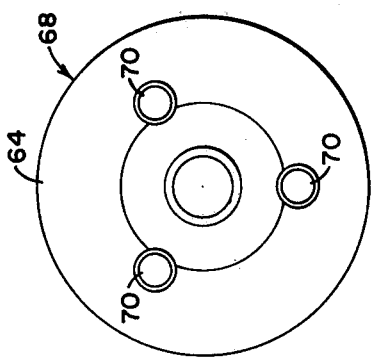
FIG. 2 is an enlarged view of the filter element retainer taken along the line 3—3 of FIG. 1.

Referring now to FIG. 1, therein is shown an inline oil filter assembly indicated in its entirety by the reference numeral 10. The filter assembly 10 includes identical right and left end members 12 and 14, respectively, provided with respective L-shaped passages 16 having first legs including ends 18 adapted for threaded connection with a fluid line and second legs including ends 20 located in a stepped mounting surface 22, the respective mounting surfaces 22 being arranged in facing relationship to each other and being provided with respective annular grooves 24 receiving opposite open ends of a cylindrical tubular filter element housing 26. For a purpose explained below, the surfaces 22 each include an annular gasket seat 28 located inwardly of the groove 26.

The end members 12 and 14 are clamped against the opposite ends of the housing 26 by a center bolt 30 received in respective through-bores 32, provided in the members 12 and 14 in general axial alignment with the second passage legs 20, and extending centrally through the housing 26 along the longitudinal axis of the latter. Threaded on the left end of the bolt 30 is a nut 34 which engages a washer 36 positioned against the left end member 14, and threaded on the right end of the bolt 30 is a nut 38 which engages a washer 40 positioned against the right end member 12. Respective resilient seals 42 are provided at the inner ends of the through-bores 32 to prevent leakage along the bolt 30.

For the purpose of filtering fluid flowing between the respective passages 16, identical right and left filter elements 44 and 46 are mounted in the housing 26 in end-to-end engagement with each other and in coaxial relationship to the bolt 30. The filter elements 44 and 46 are of a conventional construction including concentric, inner and outer perforated tubular metal shells 48 and 50, respectively, connected together at their right and left ends by right and left annular end plates 52 and 54, respectively. Filter material 56 is confined in the annular housing thus defined by the metal shells 48 and 50 and the end plates 52 and 54 of each of the elements 44 and 46.

The outer shells 50 are spaced from the housing 26 so as to define an outer annular flow passage 58 about the filter elements 44 and 46 and the inner shells 48 are spaced from the bolt 30 so as to define an inner annular passage 60 through the elements 44 and 46. To prevent fluid from flowing from the passage 58 to the passage 60 without passing through the filter material 56, the right and left ends of each of the elements 44 and 46 are respectively provided with right and left annular gaskets 62 and 64 and the elements are positioned such that the gasket 62 of the element 44 is engaged with the gasket seat 28 of the right end member 12, the gasket 62 of the element 46 is engaged with the gasket 64 of the element 44 and the gasket 64 of the element 46 is engaged with an annular gasket seat 66 of an element centering member 68 mounted on the center bolt 30 and having three equiangularly spaced centering bosses 70 projecting into the left end of and engaging the inner shell 50 of the left filter element 46. To prevent leakage to the inner annular passage 60 from occuring between the bolt 30 and member 68, a resilient seal 72 is mounted in an annular recess provided in the member 68. To ensure proper sealing, a first coil compression spring 74 is mounted on the bolt 30 and is compressed between the seal 42 in the left end member 14 and the seal 72 while a second coil compression spring 76 is mounted on the bolt 30 and is compressed between the seal 42 in the right end member 12 and a snap ring 78 carried by the bolt 30. The spring 74 also acts to keep the gasket seat 66 of the centering member 68 seated with the left gasket 64 of the element 46, to keep the gasket 62 of the element 46 seated with the left gasket 64 of the element 44 and to keep the right gasket 62 of the element 44 seated with the gasket seat 28 of the right end member 12. The spring 74 further acts to keep the right end of the right element 44 engaged with three equiangularly spaced centering bosses 80 (only two shown) provided on the right end member 12 and projecting into the right end of and engaging the inner shell 48 of the right element 44. Of course the left end member 14 also includes the bosses 80 (only one visible).

It is here to be noted that the combined length of the filter elements 44 and 46 is less than the distance between the respective gasket seats of the left and right end members 12 and 14 and with the right end of the right element 44 engaged with the right end member 14, a flow space 82 is defined between the left end member 14 and the left end of the left filter element 46. Thus the gasket seat 28 and centering bosses 80 of the left end member are inoperative in the assembly 10 as arranged in FIG. 1 and the passage 16 of the left end member 14 serves as an inlet passage while the passage 16 of the right end member 12 serves as an outlet passage.

It is to be understood that instead of two filter elements, as shown, a single element having a length equal to the combined length of the elements 44 and 46 could be used. Also, it is to be understood that the end members 12 and 14 may be used in constructing assemblies having housings, center bolts and filter elements of respective lengths varying from those disclosed.

Figure 3:
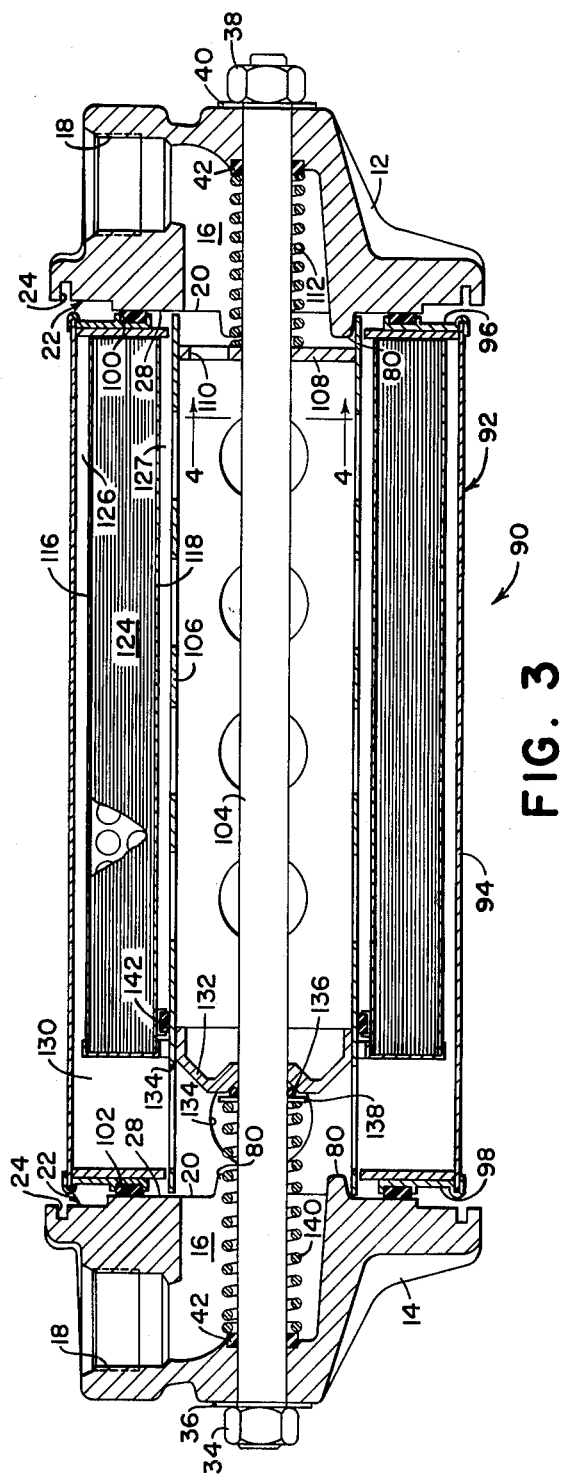
FIG. 3 is a longitudinal sectional view of an inline oil filter, of the replaceable cartridge type, embodying end members such as those shown in FIG. 1.

The end members 12 and 14 are constructed such as to be usable in constructing an inline filter assembly of the type having a replaceable cartridge which embodies a filter element. Specifically, with reference to FIG. 3, there is shown a filter assembly indicated in its entirety by the reference numeral 90. The assembly 90 includes a replaceable cartridge 92 comprising an outer cylindrical housing 94 having right and left annular end walls 96 and 98, respectively, carrying right and left annular gaskets 100 and 102, which are respectively held in engagement with the gasket seats 28 of the right and left end members 12 and 14. It is here noted that the respective annular grooves 24 of the members 12 and 14 are not operative in the assembly 90. A center bolt 104 is mounted in the manner described above relative to the assembly 10 and acts to clamp the end members 12 and 14 against the opposite ends of the cartridge 92.

Figure 4:
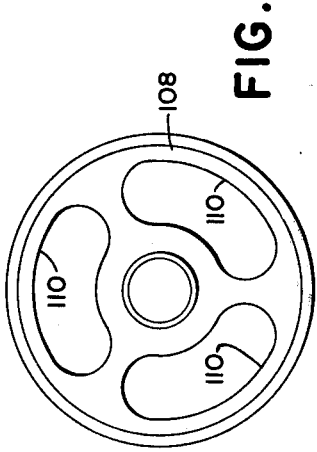
FIG. 4 is an enlarged sectional view of the cartridge centering plate taken along the line 4—4 of FIG. 3.

To prevent the cartridge 92 from being accidentally crushed during installation of the bolt 104, a perforated core tube 106 is disposed in the housing 94 in concentric relationship to the bolt 104 and has its opposite ends disposed against the respective mounting surfaces 22 of the end member 12 and 14. Preferrably, the tube 106 is dimensioned such that it may be held centered relative to the bolt 104 by the centering bosses 80 of the end members 12 and 14, which project into the right and left ends of and engage the core tube 106. However, if the core tube 106 is not dimensioned such that the bosses 80 will act to center it, a centering disc 108 (shown here for illustrative purposes only) may be fixed to the inside of the right end of the tube 106 and slidably received on the bolt 104. The disc 108 is provided with openings 110 (FIG. 4) which permit fluid to exit from the housing 94 via the passage 16 of the right end member 12. A spring 112 acts between the disc 108 and the seal 42 carried by the member 12 so as to keep the seal 42 properly seated.

Located in the housing 94 and fixed to the right end 96 thereof is a filter element 114 including inner and outer concentrically arranged perforated metal shells 116 and 118, respectively, connected together at their right and left ends by right and left plates 120 and 122. Filter material 124 is located within the enclosure thus defined by the shells 116 and 118 and the end plates 120 and 122. The inner shell 116 is spaced from the bolt 104 so as to define an inner annular fluid passage 126 and from the tube 106 to define a clearance space 127 while the outer shell 118 is spaced from the housing 94 so as to define an outer annular fluid passage 128.

As with the above-described filter assembly 10, the filter assembly 90 is arranged such that the respective fluid passages 16 of the left and right end members 12 and 14 serve as inlet and outlet passages. Specifically, the right end plate 120 of the filter element 114 is fixed to the right end 96 of the housing 94 while the left end 122 of the element 114 is spaced rightwardly from the left end 98 of the housing 94 so as to define an inlet fluid space 130 having the inner end 20 of the passage 16 of the left end member 14 in direct fluid communication therewith. To prevent fluid from flowing directly from the space 130 to the passage 126, a deflector member 132 is fixed in the tube 106 at a locatiion substantially coplanar with the left end of the filter element 114. The member 132 acts to deflect fluid entering the housing 94 from the passage 16 of the left end member 14, radially outwardly through a plurality of openings 134 provided in the tube 106 leftwardly of the member 132. To prevent inlet fluid from leaking between the bolt 104 and the member 132, the latter carries a seal 136 which is engaged by a washer 138 and held in place by a spring 140 acting between the seal 42, carried by the left end member 14 and the washer 138. A gasket 142 is provided in the left end of the inner shell 116 of the filter element 114 and is seated on the core tube 106 to prevent leakage from occuring between the shell 116 and the tube 106.

The operation of the filter assemblies 10 and 90 is quite similar. First, in the operation of the assembly 10, fluid will enter the housing 26 via the passage 16 of the left end member 14 and will be deflected to the outer annular passage 58 by the element centering member 68. When the pressure is sufficient to force the fluid through the filter elements 44 and 46 it will flow from the passage 58 to the inner annular passage 60 and then out the passage 16 of the right end member 12.

The filter elements 44 and 46 may be replaced by removing the nut 38 and washer 40 from the right end of the center bolt 30 to thereby permit the right end member 12 to be removed from the housing 26 to provide access to and replacement of the filter elements 44 and 46. If desired, the elements 44 and 46 may be replaced by a single element having the same length as the combined length of the elements 44 and 46; or the bolt 30 and housing 26 may be replaced by a bolt and housing of a different length and a filter element or filter elements of a compatible length would then be used.

In the operation of the assembly 90, fluid will enter the housing 94 via the passage 16 of the left end member 14 and will be deflected to the outer annular passage 130 by the deflector member 132. When the pressure is sufficient to force the fluid through the filter element 114 of the cartridge 92, it will flow from the passage 130 to the inner annular passage 128 and then out through the passage 16 of the right end member 12.

The cartridge 92 may be replaced by removing the nut 38 and washer 40 from the right end of the bolt 104 to thereby first permit the removal of the right end member 12 and then the removal and replacement of the cartridge 92. A new cartridge of a length different than the cartridge 92 may be substituted, requiring only that the core tube 106 be replaced by one having a length compatible with the new cartridge.

It will be appreciated that during installation of either of the assemblies 10 or 90 the end members 12 and 14 may be rotated relative to each other to the most advantageous position for connection of the outer ends 18 of the fluid passages 16 with the respective connections of the oil lines in which the assemblies 10 and 90 are to be installed.

Also it will be appreciated that by making the end members 12 and 14 identical and adapted for use either in the replaceable element assembly 10 or the replaceable cartridge assembly 40 that the assemblies 10 and 90 can be more economically manufactured.

We claim:

1. An oil filter assembly, comprising: a hollow housing having a cylindrical wall; an annular filter element including inner and outer cylindrical perforated shells disposed concentrically in the housing and having opposite ends connected by first and second annular end plates; first and second end members respectively sealingly engaged with the opposite ends of the housing; a center bolt passing through the end members; fastening means received on the bolt for holding the end members in place; said first and second end members respectively having inlet and outlet passages extending therethrough; said element being disposed with its first end plate spaced from the first end member; member means preventing fluid from flowing centrally through the first annular end plate of the element; first and second annular seals received on the center bolt and seated against the first end member and the member means; and biasing means acting between the first and second annular seals for retaining the latter in place to prevent leakage along the center bolt and through the first end member and the member means.

2. The filter assembly defined in claim 1 wherein said member means includes a centering member mounted on the center bolt and including surface means engaging the first end plate so as to center the latter in a position concentric with the center bolt.

3. The filter assembly defined in claim 1 wherein said member means includes a perforated core tube arranged concentrically about the center bolt and having opposite ends respectively engaged with the first and second end members and a sealing member located in the tube and mounted on the bolt at a location spaced axially from the first end member; annular seal means in said inner shell of said element, adjacent said first end plate and sealingly engaged with the tube.

* * * * *